Figures 1, 4:
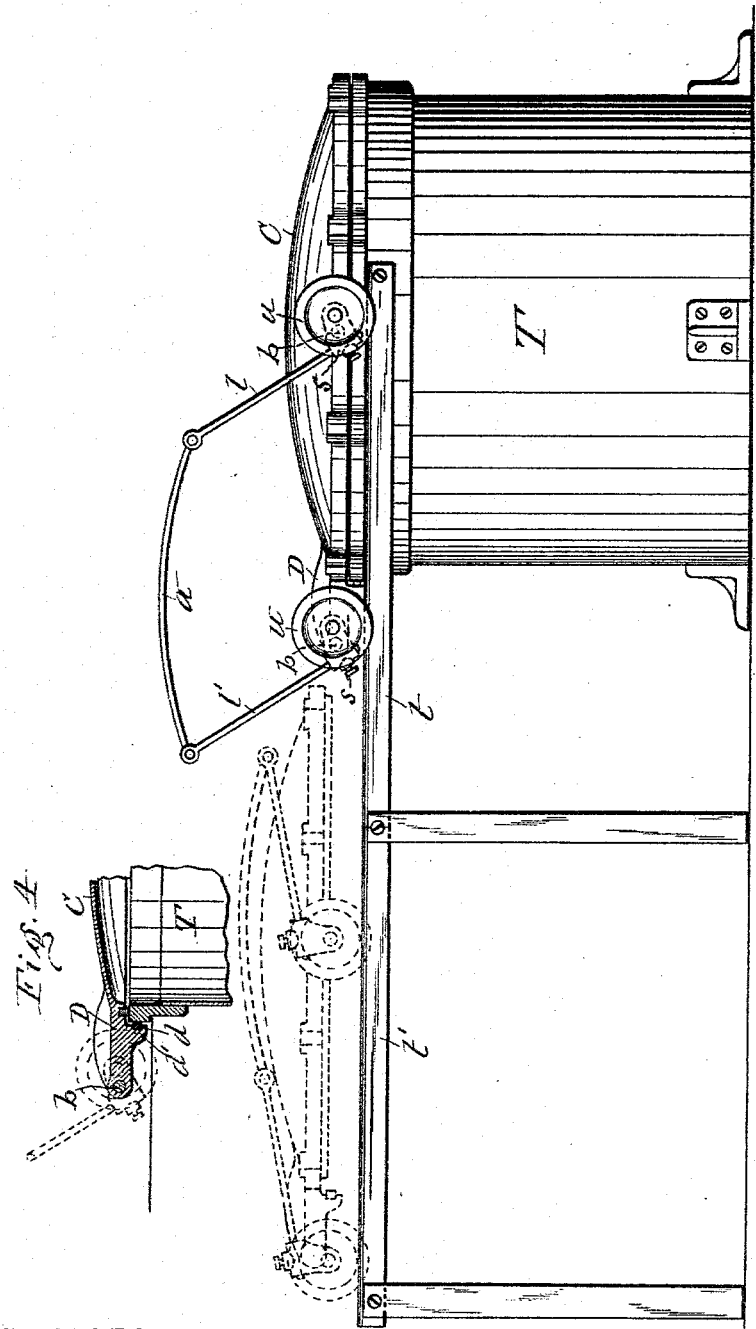

(No Model.) 2 Sheets—Sheet 1.

J. R. ROWLAND.
REMOVABLE COVER FOR TANKS.

No. 494,797. Patented Apr. 4, 1893.

WITNESSES:
C. L. Bendixon
H. M. Seamans

INVENTOR:
John R. Rowland
By Duell, Laass & Duell
his ATTORNEYS.

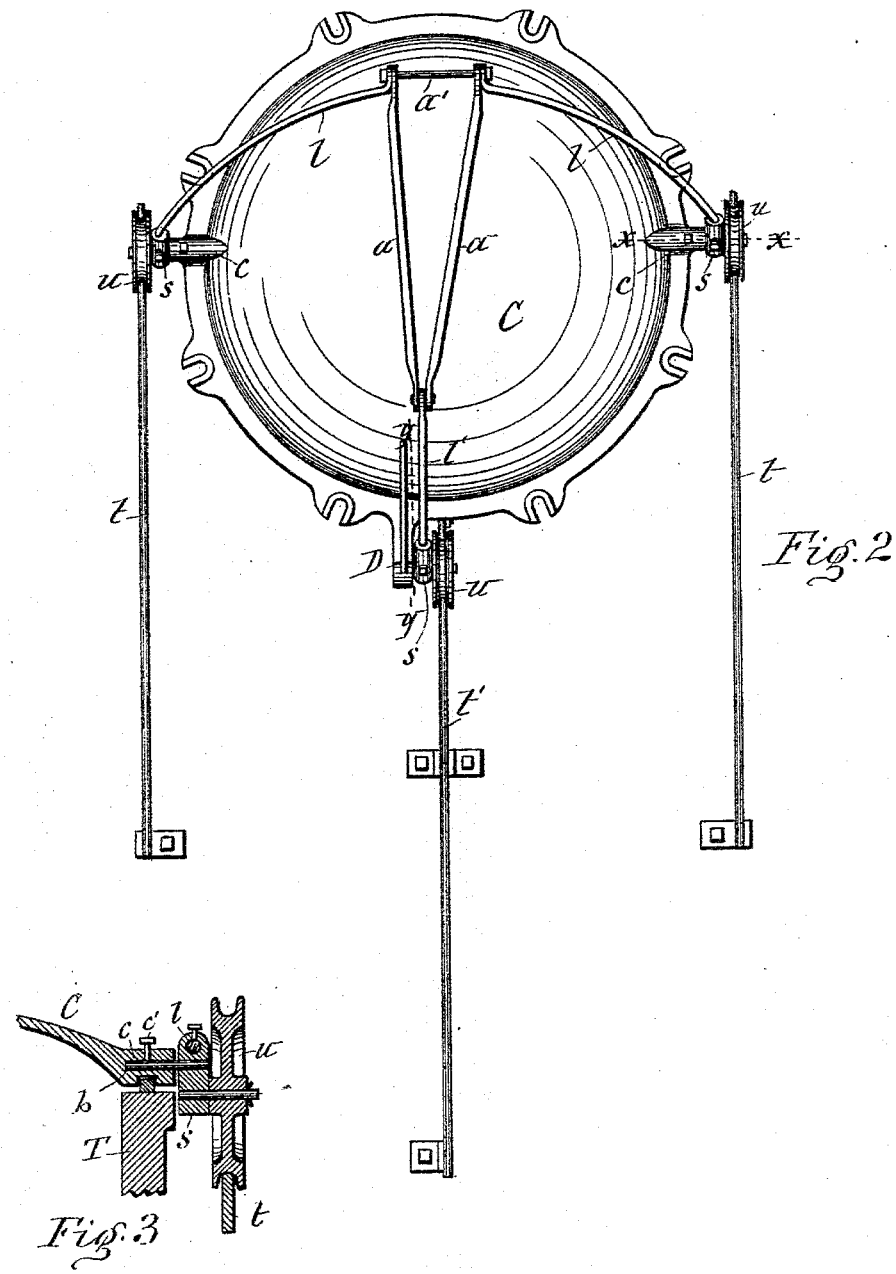

UNITED STATES PATENT OFFICE.

JOHN R. ROWLAND, OF SYRACUSE, NEW YORK, ASSIGNOR TO THE HEMINGWAY MANUFACTURING COMPANY, OF SAME PLACE.

REMOVABLE COVER FOR TANKS.

SPECIFICATION forming part of Letters Patent No. 494,797, dated April 4, 1893.

Application filed July 1, 1892. Serial No. 438,659. (No model.)

*To all whom it may concern:*

Be it known that I, JOHN R. ROWLAND, of Syracuse, in the county of Onondaga, in the State of New York, have invented new and useful Improvements in Removable Covers for Tanks, of which the following, taken in connection with the accompanying drawings, is a full, clear, and exact description.

This invention is designed for large metallic tanks having heavy removable covers, and the purpose of the invention is to provide simple, convenient and effective means for removing and replacing the cover from and to the tank.

To that end the invention consists essentially in the combination, with the tank and its removable cover, of parallel tracks extending from the tank, trucks mounted on said tracks, and levers for lifting the cover from the tank onto the trucks, all as hereinafter more fully described and specifically set forth in the claims.

In the annexed drawings Figure 1 is a side elevation of a tank provided with my improved devices for removing and replacing the cover of said tank. Fig. 2 is a top plan view of the same with the cover lifted from the tank, and Figs. 3 and 4 are vertical sections taken on lines $x, x$, and $y, y$, in Fig. 2. Similar letters of reference indicate corresponding parts.

T— represents the tank and —C— the cover thereof. From opposite sides of the upper part of the tank and in one and the same direction are extended the horizontal parallel tracks —t—t—, and between these tracks and parallel therewith is one or more tracks —t'— preferably a single track as shown in Fig. 2 of the drawings. Upon each of these tracks is mounted a suitable truck, preferably of the form of a wheel —u— pivoted to a saddle —s—, which is pivotally connected to the cover —C— eccentric in relation to the axis of the wheel. The connection of the saddle to the cover I prefer to effect by means of a steel-pin —b— inserted into a horizontal socket —c— formed on the marginal portion of the cover, in which socket the pin —b— is fastened by a set-screw —c'— as illustrated in Fig. 3 of the drawings. The saddle has an eye transversely through it and into this eye the free end of the pin —b— is inserted to serve as the pivotal connection of the saddle to the cover. The treads of the wheels are double flanged to insure their retention on the tracks. The saddle —s— of the truck on the central track —t'— I connect to the cover —C— by providing the latter with a forwardly extending arm —D— and securing the steel-pin —b— transversely in said arm, the saddle being mounted on the free end of the pin which projects from the side of the arm. To each of the saddles is fastened a separate lever —l— by which to turn the saddle on its pivotal connection with the cover. In operating said lever the axis of the wheel serves as a fulcrum which is sustained by the wheel and subjacent track, hence by means of the levers —l—l—l'— the cover can be lifted from the tank onto the trucks by which it can be carried away from the tank as indicated by dotted lines in Fig. 1 of the drawings. In order to allow all the levers to be operated simultaneously I couple them together by means of tie-rods —a—a—a'. The cross-tie —a'— being near the rear of the cover —C— when lifted from the tank, affords a convenient handle in pushing the cover from the tank.

To facilitate the adjustment of the cover over the tank in the operation of replacing the cover thereon, I provide the cover with a stop or shoulder —d— which comes in contact with the exterior of the tank in moving the cover to its requisite position over the tank. Said stop is provided with a suitable cushion —d'— to obviate excessive concussion when striking the tank.

Having thus described my invention, what I claim as new, and desire to secure by Letters Patent, is—

1. The combination, with a tank and its removable cover, of parallel tracks extending laterally from the tank, trucks mounted on said tracks movably to and from the tank, and levers for transferring the cover from the tank onto the trucks and from the trucks to the tank, as set forth.

2. The combination, with a tank and its removable cover, of parallel tracks extending from the tank, trucks mounted on said tracks and having saddles pivotally connected to the cover eccentric in relation to the wheels of the trucks, and levers connected to said saddles to turn the same and thereby lift the cover from the tank as set forth.

3. The combination, with a tank and its removable cover, parallel tracks extending horizontally from the upper part of the tank and respectively at opposite sides and central portion thereof, trucks mounted on said tracks and provided with saddles connected to the cover eccentric in relation to the wheels of the trucks, and levers attached to said saddles and coupled together to move in unison, substantially as set forth.

4. In combination with the tank and its removable cover, parallel tracks extending from the upper part of the tank and respectively at opposite sides and central portion thereof, an arm extending forward from the cover, journals projecting laterally from said arm and from opposite edges of the cover, saddles mounted on said journals, wheels mounted on the tracks and pivoted to the saddles eccentric in relation to the aforesaid journals, and levers attached to the saddles for turning the same on the said journals, substantially as set forth and shown.

5. In combination with the tank and its removable cover, parallel tracks extending from the upper part of the tank and respectively at opposite sides and central portion thereof, trucks mounted on said tracks, levers for lifting the cover from the tank onto the trucks, and a stop on the cover engaging the tank when said cover is returned to its position over the tank as set forth.

6. In combination with the tank and its removable cover, tracks —$t$—$t$— and —$t'$— extending respectively from opposite sides and central portion of the upper part of the tank, saddles —$s$—$s$—$s'$— connected to the cover over the aforesaid tracks, wheels —$n$—$u$—$u'$— mounted on the tracks and pivoted to the saddles eccentric in relation to their connections with the cover, levers —$l$—$l'$— connected to the saddles, and tie-rods —$a$—$a$—$a'$— coupling said levers together, substantially as set forth.

7. In combination with the tank and tracks extending from said tank, the cover —C— formed with horizontal sockets —$c$—, the steel-pins —$b$— secured in said sockets and projecting therefrom, the saddles —$s$— mounted on the free ends of said pins, the wheels —$u$— pivoted to the saddles eccentric in relation to the aforesaid pin, and the levers —$l$— fastened to the saddles, substantially as described and shown.

In testimony whereof I have hereunto signed my name this 29th day of June, 1892.

JOHN R. ROWLAND. [L. S.]

Witnesses:
H. M. SEAMANS,
C. L. BENDIXON.